US010984141B2

(12) United States Patent
Lillestolen et al.

(10) Patent No.: US 10,984,141 B2
(45) Date of Patent: Apr. 20, 2021

(54) SELF-POWERING TAMPER DETECTION AND RESPONSE SYSTEM ARCHITECTURE

(71) Applicant: Hamilton Sundstrand Corporation, Charlotte, NC (US)

(72) Inventors: Kirk A. Lillestolen, East Hartland, CT (US); William E. Villano, Canton, CT (US); David J. Manna, Middletown, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 218 days.

(21) Appl. No.: 16/172,305

(22) Filed: Oct. 26, 2018

(65) Prior Publication Data

US 2020/0134241 A1    Apr. 30, 2020

(51) Int. Cl.
| | |
|---|---|
| *G06F 21/00* | (2013.01) |
| *G06F 21/86* | (2013.01) |
| *G06F 1/3203* | (2019.01) |
| *G08B 13/12* | (2006.01) |
| *G08B 13/14* | (2006.01) |
| *H05K 1/02* | (2006.01) |

(52) U.S. Cl.
CPC ............ *G06F 21/86* (2013.01); *G06F 1/3203* (2013.01); *G08B 13/128* (2013.01); *G08B 13/149* (2013.01); *H05K 1/0275* (2013.01)

(58) Field of Classification Search
CPC .................... G06F 1/3203; G06F 21/86; G06F 2221/2143; G08B 13/128; G08B 13/149; H05K 1/0275
See application file for complete search history.

(56) References Cited

U.S. PATENT DOCUMENTS

| | | | |
|---|---|---|---|
| 6,747,558 B1 | 6/2004 | Thorne et al. | |
| 7,696,852 B1 * | 4/2010 | Harding | H01F 17/0006 |
| | | | 29/602.1 |
| 7,948,378 B2 | 5/2011 | Magargee et al. | |
| 8,499,173 B2 | 7/2013 | Caci | |
| 8,510,586 B2 | 8/2013 | Sumida | |
| 8,736,286 B2 | 5/2014 | Johnson, Sr. | |
| 9,740,888 B1 | 8/2017 | Aga et al. | |
| 9,798,902 B2 | 10/2017 | Ludlow et al. | |

(Continued)

OTHER PUBLICATIONS

Extended European Search Report dated Mar. 19, 2020, received for corresponding European Application No. 19205488.0, 6 pages.

*Primary Examiner* — Beemnet W Dada
*Assistant Examiner* — Ka Shan Choy
(74) *Attorney, Agent, or Firm* — Kinney & Lange, P.A.

(57) ABSTRACT

A self-powering tamper detection system architecture includes a power source, a tamper detector configured to identify a tamper event, a tamper switch electrically connected to the power source and mechanically connected to the tamper detector, a tamper controller configured to produce a tamper response when the tamper event is identified, and program memory configured to store program data. The tamper detector is configured to mechanically actuate the tamper switch when a tamper event occurs, and the tamper response provides a disruption of the program data. The tamper detector and the tamper switch can include printed circuit board and embedded transformer, whereby the embedded transformer includes an axially-moveable ferromagnetic core.

19 Claims, 12 Drawing Sheets

(56) References Cited

U.S. PATENT DOCUMENTS

| | | |
|---|---|---|
| 2007/0255966 A1 | 11/2007 | Condorelli et al. |
| 2009/0184850 A1 | 7/2009 | Schulz et al. |
| 2015/0286846 A1* | 10/2015 | Prakash ............... G01R 22/066 |
| | | 726/34 |
| 2017/0116440 A1* | 4/2017 | Huang ................ G06F 21/6218 |
| 2017/0354027 A1 | 12/2017 | Inoue |
| 2018/0032761 A1 | 2/2018 | Subramanian et al. |

* cited by examiner

SELF-POWERING TAMPER DETECTION AND RESPONSE SYSTEM ARCHITECTURE

CROSS-REFERENCE TO RELATED APPLICATIONS

Reference is hereby made to U.S. patent application Ser. No. 16/172,313, entitled "SELF-POWERING TAMPER DETECTION SWITCH AND RESPONSE SYSTEM ARCHITECTURE", and to U.S. patent application Ser. No. 16/172,320, entitled "TAMPER DETECTION AND RESPONSE DEACTIVATION TECHNIQUE", both of which were filed on the same date as this application.

BACKGROUND

The present disclosure relates to tamper detection systems, and more particularly, to a self-powering tamper detection and response system architecture for electronic circuitry.

The protection of critical information contained on printed circuit boards from unwanted access is necessary to ensure the integrity of components and systems in which those circuits can reside. For example, sensitive program data that can be stored in circuitry must not be accessed by unauthorized persons, competitors, or adversaries. In some situations, the unauthorized tampering of program data can affect the proper functioning of a component. In other situations, the unauthorized access of program data can pose a risk to competitive advantage and/or national security. Multiple levels of security can often be used to prevent the unauthorized access to program data, but as a final measure of security, an electronic component may have a means of detecting when unauthorized tampering is occurring. When a tampering event is triggered, an electronic component is instructed to erase or disrupt the stored program data so that the data cannot be accessed by an unauthorized party.

Several anti-tamper systems have been developed to achieve the goal of detecting and responding to a tampering event. For example, U.S. Pat. No. 9,798,902, to Ludlow, discloses anti-tamper sensors involving transducers. Tamper detection systems involving transducers are known in the art, whereby a transducer utilizes the conversion of one form of energy into another to achieve a response. For example, U.S. Pat. No. 8,499,173, to Caci, discloses a light emitter, a light receiver, and a reflector for detecting tampering on a circuit board. Tamper detections have also been developed to detect tampering on consumer electronics products, which can be useful for products that are under a manufacturer's warranty. For example, U.S. Pat. No. 8,736,286, to Johnson, discloses a means of detecting consumer abuse without having to rely upon the explanatory statements of the user who may be returning a unit that is no longer working according to the original specification of the manufacturer.

SUMMARY

A self-powering tamper detection system architecture includes a power source, a tamper detector configured to identify a tamper event, a tamper switch electrically connected to the power source and mechanically connected to the tamper detector, a tamper controller configured to produce a tamper response when the tamper event is identified, and program memory configured to store program data. The tamper detector is configured to mechanically actuate the tamper switch when a tamper event occurs, and the tamper response provides a disruption of the program data.

A method of using a self-powering tamper system architecture that includes a power source, a tamper detector configured to identify a tamper event, a tamper switch electrically connected to the power source and mechanically connected to the tamper detector, a tamper controller configured to produce a tamper response when the tamper event is identified, and program memory configured to store program data. The method includes the steps of: monitoring, with the tamper detector, for a mechanical movement indicative of a tamper event; mechanically actuating the tamper switch when an indicia of the tamper event occurs, to cause transmission of an electrical signal from the power source to the tamper controller when the indicia of the tamper event occurs; producing, with the tamper controller, a tamper response when the tamper event occurs; and disrupting, with the tamper controller, the program data when the tamper response is produced.

A self-powering tamper detection system includes a power source, a tamper detector including a moveable ferromagnetic core, a tamper switch including a printed circuit board having an aperture therein, an embedded transformer that includes a chassis strut disposed perpendicularly to the printed circuit board, a circular primary winding encircling the aperture, one or more circular secondary windings encircling the aperture, and a moveable ferromagnetic core configured to move axially within the chassis strut, thereby passing through the aperture, an oscillator configured to produce a time-varying voltage waveform, a driver configured to apply the time-varying voltage waveform to the circular primary winding, thereby inducing a time-varying voltage waveform in each of the one or more circular secondary windings when the moveable ferromagnetic core magnetically couples the primary winding to each of the one or more circular secondary windings to produce an induced time-varying secondary voltage, a decoder configured to produce a periodic signal representative of the induced time-varying secondary voltage, a timer configured to produce a first output when the periodic signal is present and produce a second output when the periodic signal is not present, a tamper controller configured to produce a tamper response when the tamper event is identified, and program memory configured to store program data. The moveable ferromagnetic core is configured such that a tamper event causes the moveable ferromagnetic core to move axially within the chassis strut, the second output is indicative of the tamper event, and the tamper response produces a disruption of the program data.

DETAILED DESCRIPTION

Figure 1:
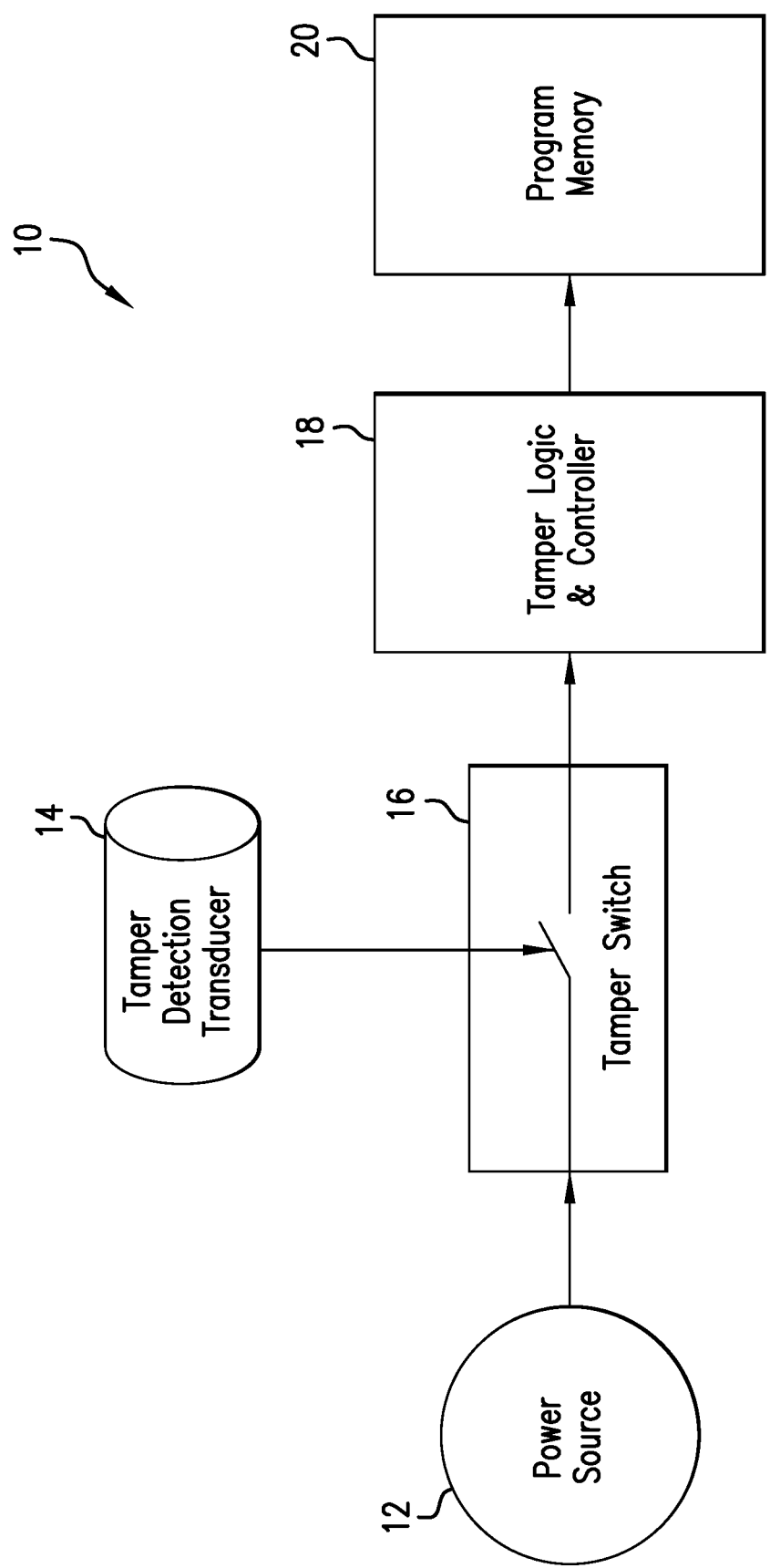
FIG. 1 is a block diagram of a tamper system of the prior art.

FIG. 1 is a block diagram of a representative tamper system architecture of the prior art. Shown in FIG. 1 are tamper system architecture 10, power source 12, tamper detection transducer 14, tamper switch 16, tamper controller 18, and program memory 20. Power source 12 can be a power supply, such as a power supply that powers the equipment (not shown) in which tamper system architecture 10 resides. During operation, tamper detection transducer 14 monitors for a tampering condition. In a particular embodiment, tamper detection transducer 14 can be a piezoelectric transducer, which transforms a pressure force from tampering into an electrical signal to represent tampering. In another particular embodiment, tamper detection transducer 14 can be an optical transmitter and optical receiver that convert electrical energy into optical energy, and optical energy into electrical energy, respectively. Accordingly, a change in the optical transmission path could be representative of a tamper condition. When a tamper event occurs, tamper switch 16 receives a tamper signal from tamper detection transducer 14 and provides a signal to tamper controller 18 representative of the tamper event. Tamper controller 18 can also be referred to as a tamper logic and controller circuit. Tamper controller 18 evaluates one or more signals received from tamper switch 16 to evaluate the tamper condition and determine the tamper response. If tamper controller 18 determines that the tamper event warrants destruction of stored program data, tamper controller 18 provides instructions to program memory 20 that disrupt and/or erase the stored program data from program memory 20 thereby preventing the unauthorized access to stored program data.

Figure 2:
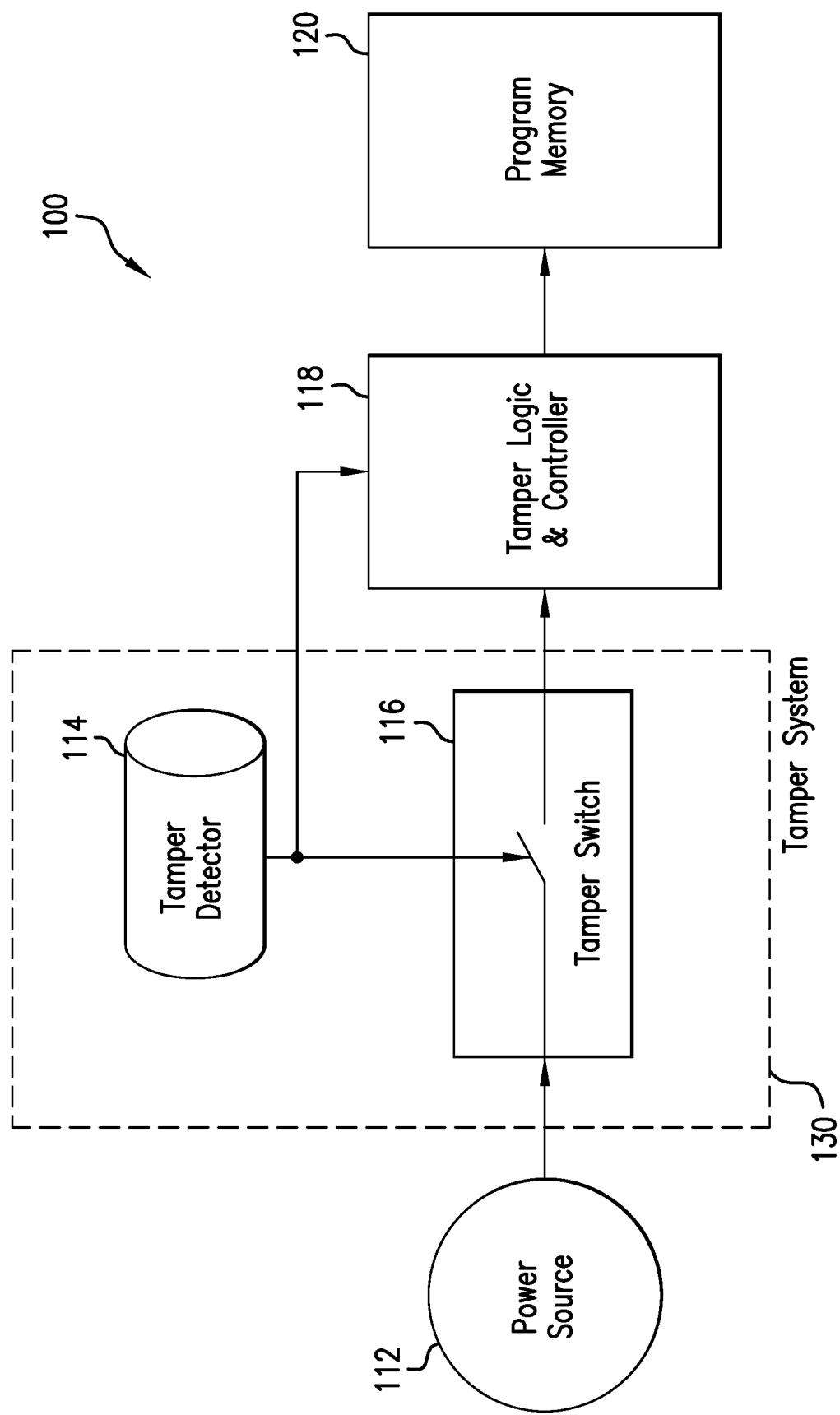
FIG. 2 is a block diagram of a self-powering tamper system.

FIG. 2 is a block diagram of the self-powering tamper system architecture of the present disclosure. Shown in FIG. 2 are tamper system architecture 100, power source 112, tamper detector 114, tamper switch 116, tamper controller 118, program memory 120, and tamper system 130. In the illustrated embodiment, power source 112 is a long-life source of electrical power that is available for a prolonged duration of time. In an embodiment, power source 112 can be a lithium battery that stores usable energy for 5-20 years. In another embodiment, power source 112 can be a super-capacitor that stores usable energy for 2-10 months. Super-capacitors can be available under various trademarks (e.g., CAPATTERY™ capacitor manufactured by Evans Capacitor Company). In some embodiments, power source 112 receives a charging voltage from another power supply (not shown) during operation of the equipment (not shown) in which tamper system architecture 100 resides, and then power source 112 remains charged for 2-10 years following the shutdown of the equipment. In other embodiments, power source 112 can be a long-life energy cell that stores electrical energy for an indefinite duration of time. In some embodiments, power source 112 can store energy for more than 20 years. In other embodiments, power source 112 can store energy for more than 50 years. It can be beneficial for power source 112 to store energy for a duration of time that is equivalent to the expected service life of the equipment in which tamper system architecture 100 resides. Tamper system architecture 100 can also be referred to as a tamper detection system architecture.

Referring again to FIG. 2, tamper detector 114 is a transducerless device that can be actuated when a tampering event occurs. The present disclosure is predicated on the storing of program data in program memory 120 which is contained within a physical enclosure (not shown). Therefore, tamper detector 114 senses a tampering event as a result of the actuation of at least one component of the physical enclosure. Specific embodiments of the tamper detector will be described in FIGS. 3A-3B, 8A-8D, and 9. During a tampering event, tamper detector 114 actuates tamper switch 116, thereby causing electrical power to be delivered from power source 112 via tamper switch 116 to tamper controller 118. Tamper switch 116 can be a mechanical, electromechanical, or electronic switch. Together, tamper detector 114 and tamper switch 116 can be referred to as tamper system 130.

In the illustrated embodiment, tamper detector 114 also provides a tamper signal directly to tamper controller 118 when a tamper event occurs. Tamper controller 118 can also be referred to as a tamper logic and controller circuit. Tamper controller 118 evaluates one or more signals received from tamper switch 116 and/or tamper detector 114 to evaluate the tamper condition and determine the tamper response. If tamper controller 118 determines that the tamper event warrants destruction of stored program data, tamper controller 118 provides instructions to program memory 120 that disrupt and/or erase the stored program data from program memory 120 thereby preventing the unauthorized access to stored program data. In some embodiments, program memory 120 can be non-transitory machine-readable media including without limitation a field-programmable gate array (FPGA), flash memory, random access memory (RAM), programmable read-only memory (PROM), and erasable programmable read-only memory (EPROM). In some of these embodiments, program memory 120 can utilize semiconductor, magnetic, optical, electrostatic, and/or atomic storage. All forms of data storage on program memory 120 are within the scope of the present disclosure.

Figure 3A:
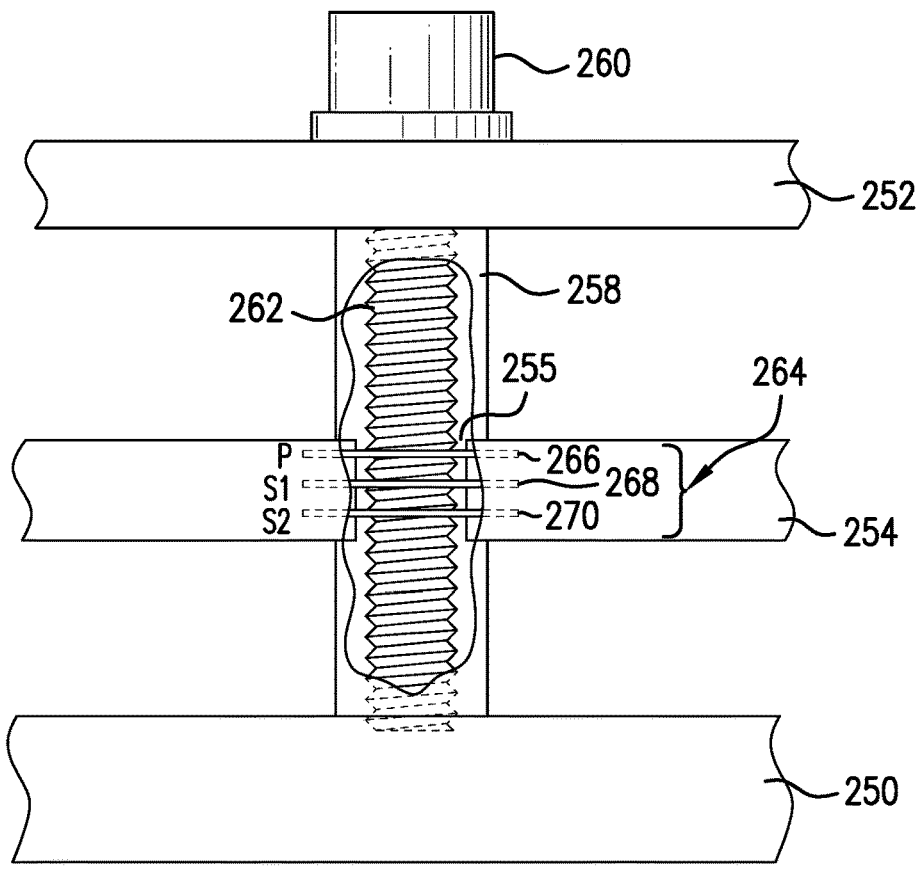
FIG. 3A is a side view of an embodiment of a tamper detection embedded transformer.
Figure 3B:
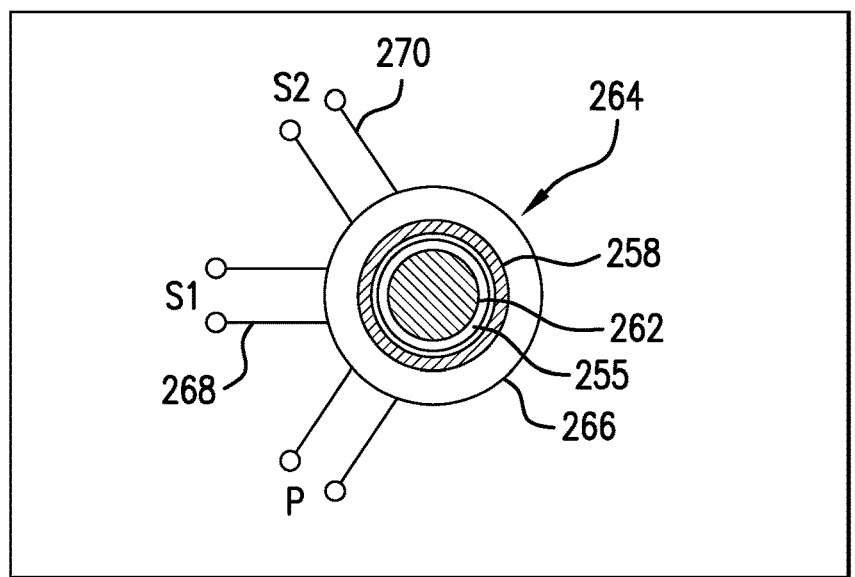
FIG. 3B is a top view of an embodiment of a tamper detection embedded transformer.

FIG. 3A is a side view of an embodiment of a tamper system 130 that utilizes an embedded transformer, and FIG. 3B is a top view of the tamper detection embedded transformer. Shown in FIGS. 3A-3B are chassis 250, chassis cover 252, printed circuit board 254, aperture 255, chassis strut 258, cover screw 260, shaft 262, embedded transformer 264, primary winding 266, first secondary winding 268, and second secondary winding 270. Chassis 250 encloses program memory 120 in which program data are stored. During normal operation chassis cover 252 is in place as shown in FIG. 3A, providing a physical boundary preventing access to various electronic circuitry that includes program memory 120. In the illustrated embodiment, cover screw 260 secures chassis cover 252 to chassis 250, thereby preventing chassis cover 252 from being removed. For an unauthorized person to gain access to program memory 120, cover screw 260 must first be removed. Cover screw 260 includes shaft 262 which is held in place by chassis strut 258, thereby securing chassis cover 252 to chassis 250. Chassis strut 258 also holds printed circuit board 254 in place. Printed circuit board 254 is a multilayer printed circuit board (PCB). Multilayer PCBs are known to those who are skilled in the electronics arts as being useful in providing dense circuit architecture, for example, those that utilize integrated circuit chips. Multilayer PCBs have one or more embedded layers containing circuit traces in addition to top and/or bottom surface circuit traces. Printed circuit board 254 includes aperture 255, through which shaft 262 can pass. Accordingly, primary winding 266, first secondary winding 268, and second secondary winding 270 each encircle aperture 255. In the illustrated embodiment, chassis strut 258 is a non-ferromagnetic material and shaft 262 is a ferromagnetic material.

First secondary (S1) winding 268 and second secondary (S2) winding 270 are connected in series, which can have one or more beneficial effects. This increases the voltage amplitude at the combined secondary output of embedded transformer 264, and it can also assist in providing common mode noise rejection. In other embodiments, first secondary (S1) winding 268 and second secondary (S2) winding 270 can be connected in other configurations. Moreover, in some embodiments, first secondary (S1) winding 268 and/or second secondary (S2) winding 270 can include more than one turn. An advantage to a multi-turn first secondary (S1) winding 268 and/or second secondary (S2) winding 270 can be to provide an output voltage having a greater amplitude than is provided by a single turn. In some of these embodiments, embedded transformer 264 can include secondary winding(s) formed on multiple layers of printed circuit board 254. For example, one or more loops can be formed on the top and/or bottom surfaces of printed circuit board 254. In other embodiments, first secondary (S1) winding 268 and/or second secondary (S2) winding 270 can include a multi-loop planar circuit trace formed as a spiral and/or by connected concentric circular traces. In yet other embodiments, second secondary winding 270 can be omitted and embedded transformer 264 can include only primary winding 266 and first secondary winding 268. In these other embodiments, first secondary winding 268 can be called the secondary winding, and the secondary winding can have one or more turns. For example, in some of these other embodiments, the secondary winding can have multiple turns that are formed on a single layer of printed circuit board 254.

Referring again to FIGS. 3A-3B, printed circuit board 254 contains embedded transformer 264, which is an electrical transformer that includes primary (P) winding 266, first secondary (S1) winding 268, and second secondary (S2) winding 270. In the illustrated embodiment, primary winding 266, first secondary winding 268, and second secondary winding 270 are each a circuit trace on different layers of printed circuit board 254 in close proximity to each other, encircling aperture 255. Primary winding 266, first secondary winding 268, and second secondary winding 270 are each approximately circular and are stacked vertically with respect to the axis of chassis strut 258, each having two connection terminals as shown in FIG. 3B. Accordingly, in some embodiments, primary winding 266, first secondary winding 268, and second secondary winding 270 are each approximately one loop, thereby each having a single turn of wire, with "turns" being used to characterize the windings of electrical transformers.

It is to be appreciated that primary winding 266, first secondary winding 268, and second secondary winding 270 are connected to associated components by wires and/or conductive traces on printed circuit board 254, and that interlayer conductors (i.e., "vias") are used to provide electrical connections to embedded layers (including primary winding 266, first secondary winding 268, and second secondary winding 270) on printed circuit board 254. The associated methods for interconnecting the various layers and components on printed circuit boards are known to those in the electrical arts. Accordingly, the supporting traces and vias are not shown on printed circuit board 254 in FIGS. 3A-3B for illustration clarity. In the illustrated embodiment, primary winding 266, first secondary winding 268, and second secondary winding 270 each are about 0.9 turns as a result of the via connectors (not labeled). In other embodiments, primary winding 266, first secondary winding 268, and second secondary winding 270 can each form at least 0.75 turns. In some embodiments, particularly where printed circuit board 254 has more than three layers of circuit traces, it can be beneficial for primary winding 266, first secondary winding 268, and second secondary winding 270 to be located on three adjacent layers which can help maximize the magnetic flux coupling between primary winding 266, first secondary winding 268, and second secondary winding 270. As used in this disclosure, "magnetic flux coupling" can be referred to a "magnetic coupling" with regard to the transformer action between primary winding 266, first secondary winding 268, and second secondary winding 270.

Figure 4A:
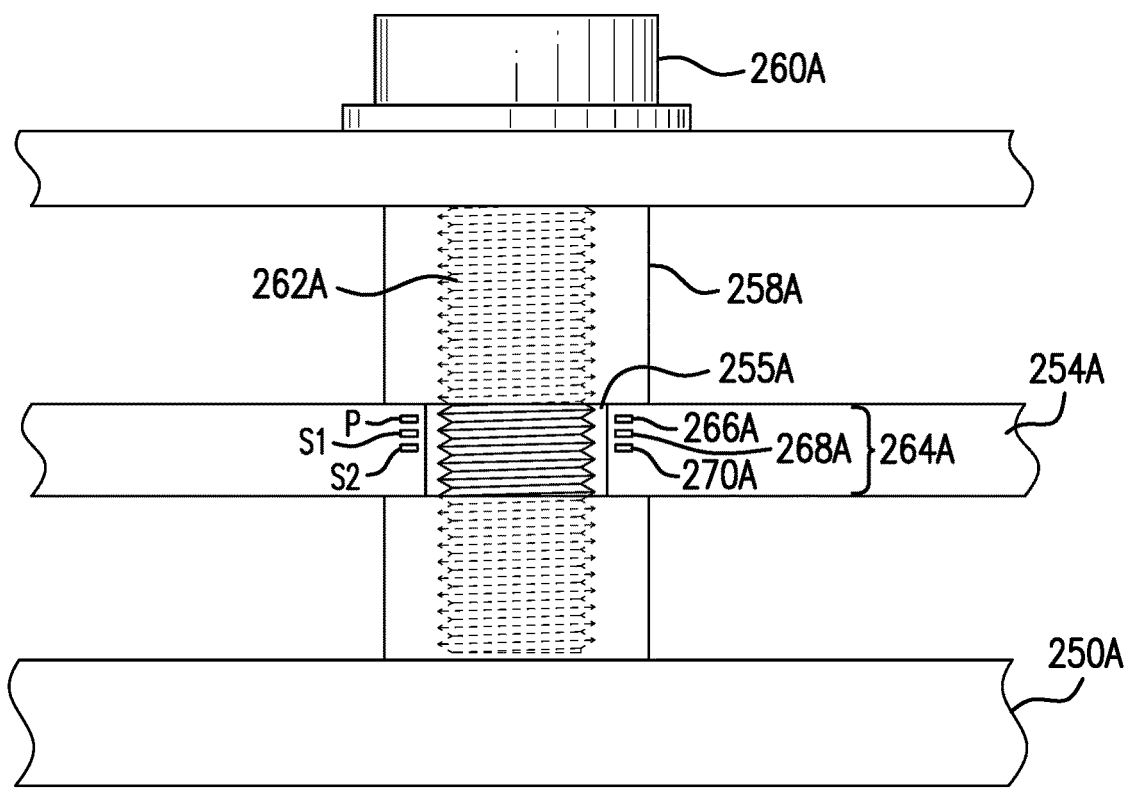
FIG. 4A is a side view of a second embodiment of a tamper detection embedded transformer.
Figure 4B:
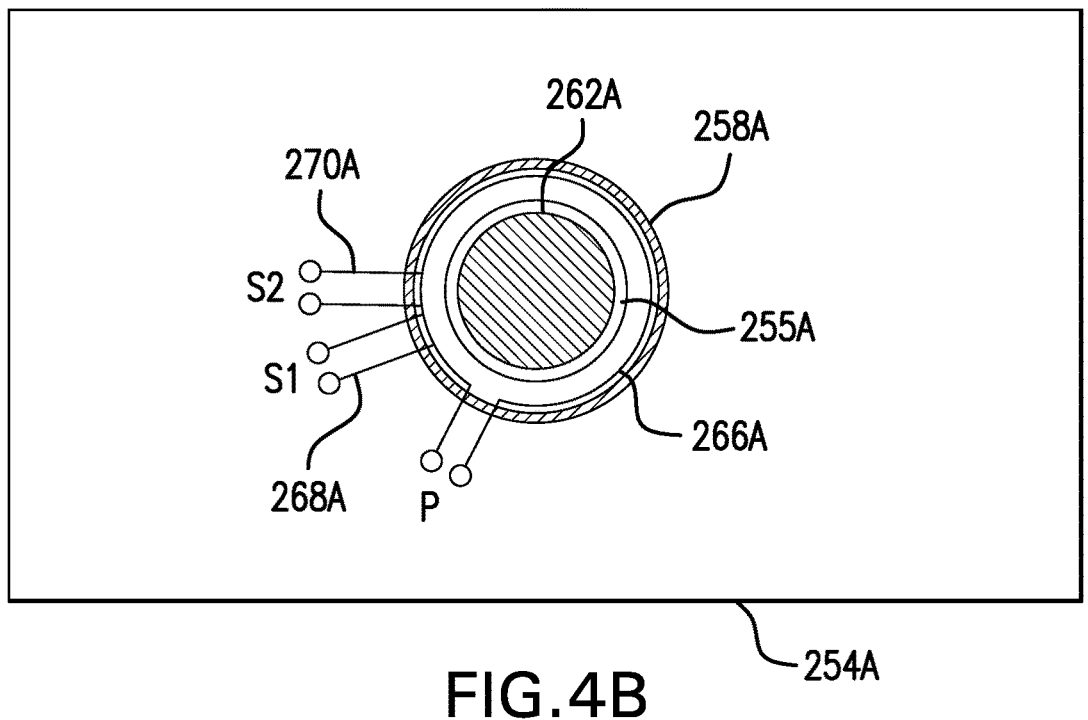
FIG. 4B is a top view of a second embodiment of a tamper detection embedded transformer.

FIG. 4A is a side view of a second embodiment of a tamper detection embedded transformer, and FIG. 4B is a top view of a second embodiment of a tamper detection embedded transformer. The features shown in FIGS. 4A-4B follow the same numbering as those described above with respect to FIGS. 3A-3B, with the addition of the letter "A" following each number. The description of FIGS. 4A-4B is similar to that provided above with respect to FIGS. 3A-3B, with the following exceptions. Primary winding 266A, first secondary winding 268A, and second secondary winding 270A do not surround chassis strut 258A (as shown in FIG. 4A). Instead, embedded transformer 264A in printed circuit board 254A is vertically aligned with chassis strut 258A and adjacent to shaft 262A as shown in FIG. 4A. In the illustrated embodiment, magnetic flux coupling between primary winding 266, first secondary winding 268, and second secondary winding 270, when in the vicinity of shaft 262A, is greater than in an equivalent configuration shown in FIGS. 3A-3B. Accordingly, in the illustrated embodiment, the induced voltages in first secondary winding 268A and/or second secondary winding 270A, when in the vicinity of shaft 262A, is greater than in an equivalent configuration shown in FIG. 3A.

Figure 5A:
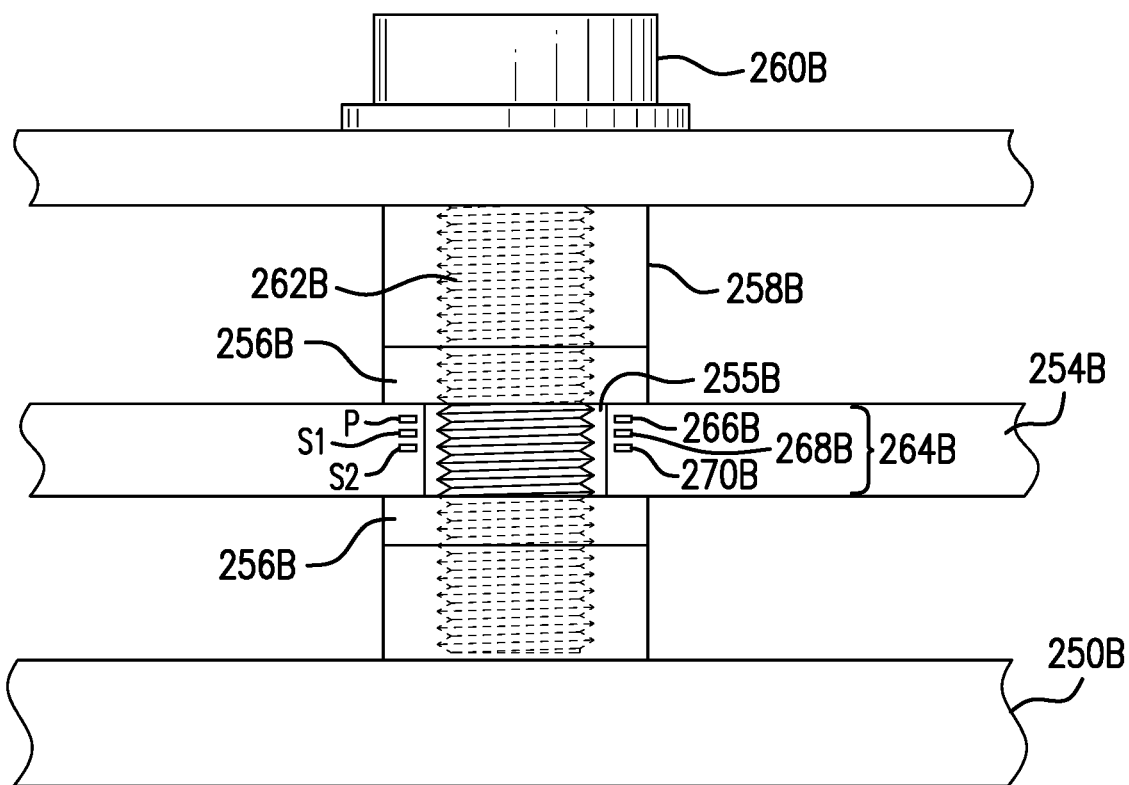
FIG. 5A is a side view of a third embodiment of a tamper detection embedded transformer.
Figure 5B:
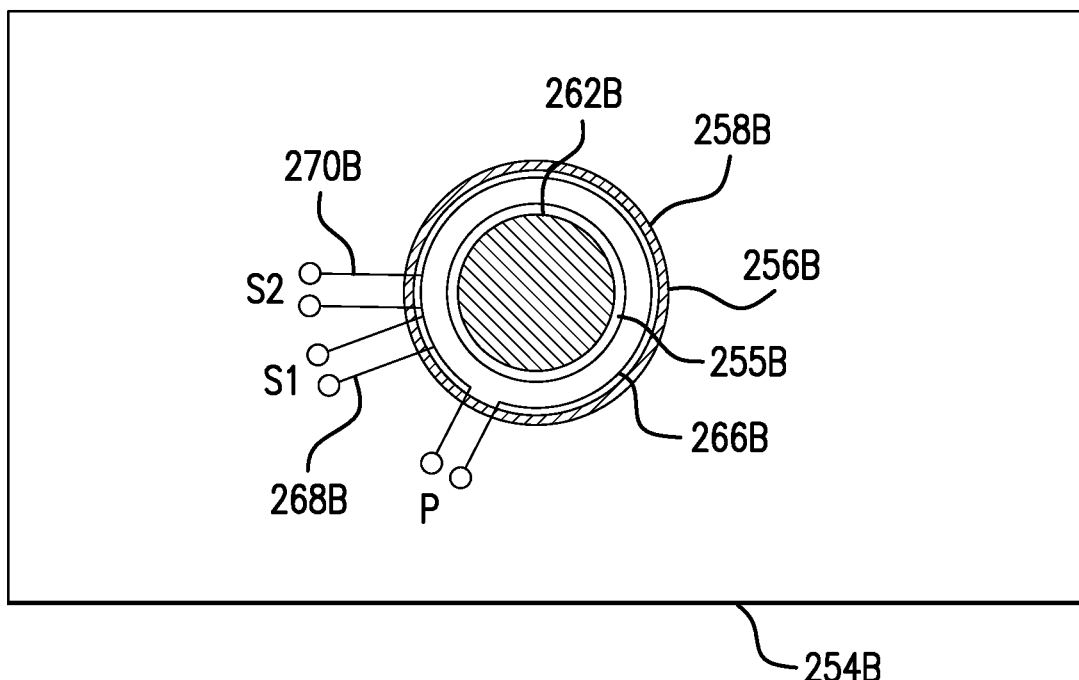
FIG. 5B is a top view of a third embodiment of a tamper detection embedded transformer.

FIG. 5A is a side view of a third embodiment of a tamper detection embedded transformer, and FIG. 5B is a top view of a third embodiment of a tamper detection embedded transformer. The features shown in FIGS. 5A-5B follow the same numbering as those described above with respect to FIGS. 3A-3B, with the addition of the letter "B" following each number. The description of FIGS. 5A-5B is similar to that provided above with respect to FIGS. 4A-4B, with the following exceptions. A first ring 256B is directly above embedded transformer 264B and axially aligned with chassis strut 258B, with respect to the orientation shown in FIG. 5A. Similarly, a second ring 256B is directly below embedded transformer 264B and axially aligned with chassis strut 258B, with respect to the orientation shown in FIG. 5A. In the illustrated embodiment, rings 256B are ferromagnetic material and therefore assist in providing magnetic flux coupling between primary winding 266, first secondary winding 268, and second secondary winding 270 when shaft 262B is in position in embedded transformer 264B, as shown in FIG. 5A. Accordingly, in the illustrated embodiment, the induced voltages in first secondary winding 268B and/or second secondary winding 270B, when in the vicinity of shaft 262B, is greater than in an equivalent configuration shown in FIG. 4A. An electrical schematic diagram (not shown) for embedded transformer 264 could depict a variably-coupled transformer depending on the axial position on shaft 262B.

Figure 6A:
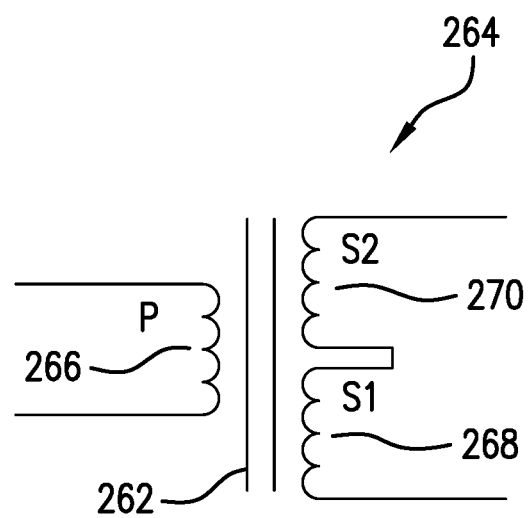
FIG. 6A is a schematic diagram of the embedded transformer of FIG. 3A in a normal equipment configuration.
Figure 6B:
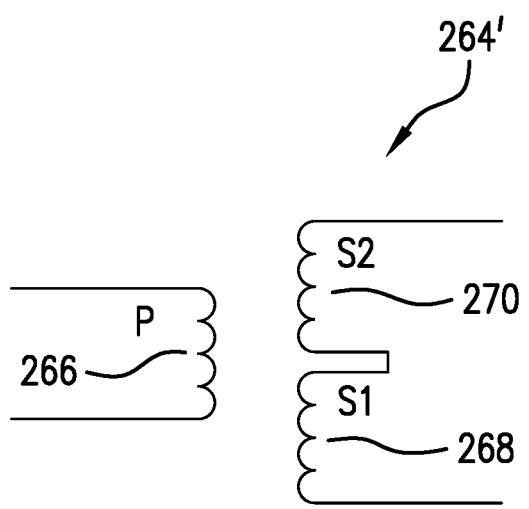
FIG. 6B is a schematic diagram of the embedded transformer of FIG. 3A in an abnormal equipment configuration.

FIG. 6A is a schematic diagram of embedded transformer 264 shown in FIG. 3A when cover screw 260 is installed to hold chassis cover 252 in place on chassis 250. FIG. 6B is a schematic diagram of embedded transformer 264' when cover screw 260 is removed. Shown in FIGS. 6A-6B are shaft 262, embedded transformer 264, primary winding 266, first secondary winding 268, and second secondary winding 270. It is to be appreciated that a standard schematic symbol for a transformer is shown in FIGS. 6A-6B, despite primary winding 266, first secondary winding 268, and second secondary winding 270 each being a single conductive loop. Moreover, the schematic symbol shown in FIG. 6B depicts as air core transformer when shaft 262 is removed because chassis strut 258 is non-ferromagnetic in the illustrated embodiment. In other embodiments, ferromagnetic materials other than shaft 262 can be located near embedded transformer 264. Referring again to FIG. 6A, shaft 262 acts as the ferromagnetic core of embedded transformer 264, assisting in magnetic flux coupling (i.e., magnetic coupling) between primary winding 266, first secondary winding 268, and second secondary winding 270.

During the operation of embedded transformer 264, an alternating voltage (i.e., time-varying voltage from an alternating current waveform) is applied across the terminals of primary winding 266, thereby inducing a voltage in each of first secondary winding 268 and second secondary winding 270 by magnetic flux coupling between primary winding 266, first secondary winding 268, and second secondary winding 270 as a result of shaft 262 forming the mutual inductive coupling as a result of the ferromagnetic nature of shaft 262. In other words, shaft 262 is the ferromagnetic core of embedded transformer 264. Accordingly, if shaft 262 is removed from embedded transformer 264 as a result of removing cover screw 260, the magnetic flux coupling between primary winding 266, first secondary winding 268, and second secondary winding 270 will be reduced. Therefore, the voltage induced in first secondary winding 268 and second secondary winding 270 in response to a time-varying alternating voltage applied across the terminals of primary winding 266 will be reduced. FIG. 6B represents the equivalent schematic diagram of embedded transformer 264' when cover screw 260 is removed, in which the magnetic flux coupling between primary winding 266, first secondary winding 268, and second secondary winding 270 is significantly reduced. Accordingly, the voltage induced in first secondary winding 268 and second secondary winding 270 in response to a time-varying alternating voltage applied across the terminals of primary winding 266 will be significantly reduced. In some embodiments, there can be no discernable voltage induced in first secondary winding 268 and/or second secondary winding 270.

Figure 7:
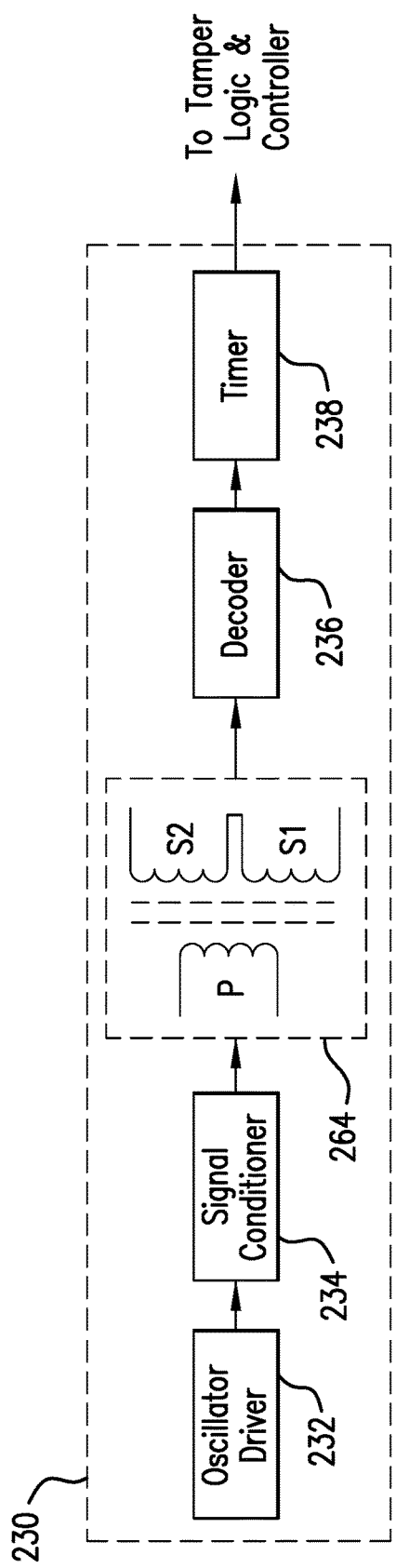
FIG. 7 is a block diagram of an embodiment of a tamper system utilizing the embedded transformer of FIG. 3A.

FIG. 7 is a block diagram of an embodiment of the tamper system utilizing the embedded transformer of FIG. 3A. Shown in FIG. 7 are tamper system 230, oscillator driver 232, signal conditioner 234, decoder 236, timer 238, and embedded transformer 264. FIG. 7 depicts a representative circuit block diagram that can be used with embedded transformer 264, and will be described in general terms as follows. Oscillator driver 232 receives electrical power from a power supply (not shown), producing a time-varying waveform having a frequency that can vary between 50 Hz-1 MHz. The output of oscillator driver 232 is applied to signal conditioner 234, producing an alternating voltage that is applied across the primary of embedded transformer 264, thereby inducing voltage across the combined secondary of embedded transformer 264. Decoder 236 senses the secondary voltage across embedded transformer 264, providing a periodic signal to timer 238 representative of the induced voltage at the secondary of embedded transformer 264. Timer 238 is configured to require a periodic signal input from decoder 236 as a representation of normal operation.

During a tamper event in which an unauthorized user removes cover screw 260 to gain access within chassis 250 (as shown in FIG. 3A), shaft 262 is removed from embedded transformer 264, thereby reducing the magnetic flux coupling between primary winding 266, first secondary winding 268, and second secondary winding 270. As oscillator driver 232 and signal conditioner 234 continue to provide a time-varying alternating voltage across the primary of embedded transformer 264, the voltage potential at the secondary of embedded transformer 264 is reduced as a result of the reduced magnetic flux coupling. Accordingly, decoder 236 stops producing periodic signals and timer 238 responds to the absence of periodic signals, thereby providing an input to tamper controller 118 indicating that a tamper event has occurred.

Figure 8:
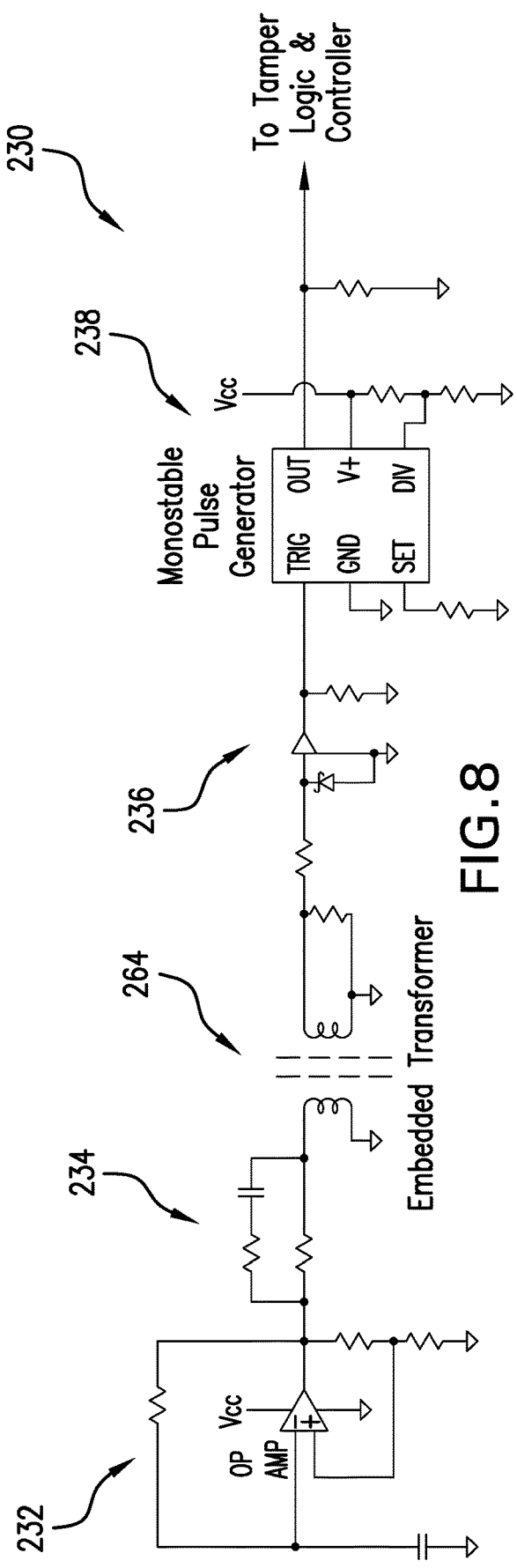
FIG. 8 is an exemplary electrical schematic diagram of the tamper system of FIG. 5.

FIG. 8 is an exemplary electrical schematic diagram of tamper system 230 described above with respect to FIG. 7. Shown in FIG. 8 are tamper system 230, oscillator driver 232, signal conditioner 234, decoder 236, timer 238, and embedded transformer 264. The electronic components shown in FIG. 6 create a representative electronic circuit that performs the functionality of tamper system 230. In the illustrated embodiment, oscillator driver 232 includes an operational amplifier (i.e., Op Amp), and timer 238 includes a monostable pulse generator (i.e., one shot). It is to be appreciated that a detailed description of each electronic component is unnecessary. Instead, major sections of tamper system 230 are denoted as oscillator driver 232, signal conditioner 234, decoder 236, timer 238, and embedded transformer 264, each having an operation that is similar to the blocks described above with respect to FIG. 7. In some embodiments a different circuit can be used to sense the removal of cover screw 260, thereby altering the magnetic flux coupling in embedded transformer 264 and providing an indication that a tamper event has occurred.

Figure 9A:
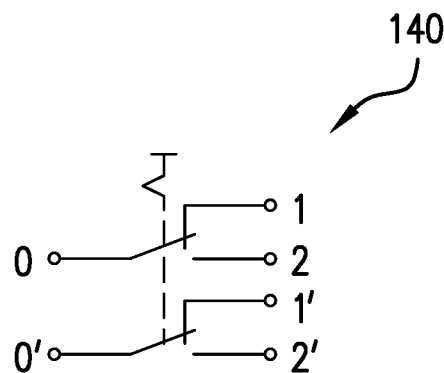
FIG. 9A is an electrical schematic diagram of an embodiment of a tamper switch.

FIG. 9A is an electrical schematic diagram of an embodiment of tamper switch 116 shown in FIG. 2. Switch device 140 shown in FIG. 9A is a double-pole double-throw (DPDT) switch having two sets of contacts (i.e., two poles) and two positions (i.e., two throws). Switch device 140 is an electromechanical component which responds to a mechanical actuation. Switch device 140 is shown in a "normal" position with regard to an electrical schematic diagram. Switch device 140 is held in the normal position by the force of a mechanical spring (not shown). When switch device is actuated by an external force, the mechanical spring is compressed, aligning switch device 140 in an anti-normal position. It is to be appreciated that in spring-return switches, "normally open (NO)" and "normally closed (NC)" refer to the alignment of electrical contacts when the spring-return switch is in a relaxed (i.e., not compressed) condition.

Figure 9B:
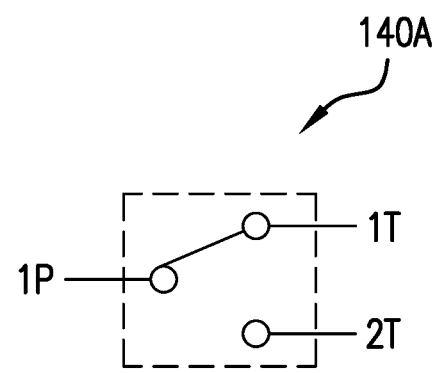
FIG. 9B is an electrical schematic diagram of a second embodiment of a tamper switch.

FIG. 9B is an electrical schematic diagram of a second embodiment of tamper switch 116. Switch device 140A shown in FIG. 9B is a single-pole double-throw (SPDT) switch. The description of switch device 140A is similar to that provided for switch device 140 provided above with respect to FIG. 9A, except that switch device 140A has only one set of contacts (i.e., one pole).

Tamper switches 140, 140A depicted above in FIGS. 9A-9B are non-limiting exemplary embodiments of tamper switch 116, and many other switch contact configurations can be used in different embodiments. For example, in some embodiments a double-pole single-throw (DPST) switch can be used. In a particular embodiment, a single-pole single-throw (SPST) switch can be used. In other embodiments, electrical switches having multiple poles and/or multiple positions (i.e., more than two poles and/or more than two positions) can be used.

Figure 10A:
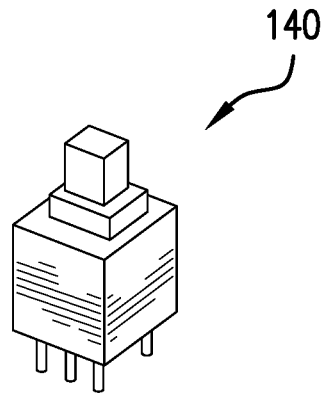
FIG. 10A is a perspective view of an embodiment of the tamper switch.
Figure 10B:
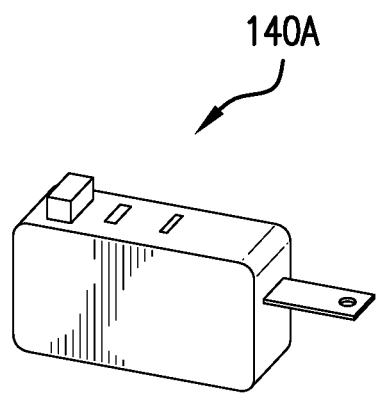
FIG. 10B is a perspective view of a second embodiment of the tamper switch.
Figure 10C:
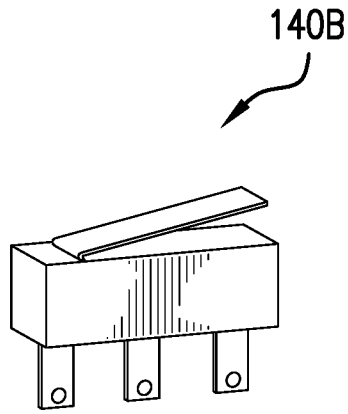
FIG. 10C is a perspective view of a third embodiment of the tamper switch.
Figure 10D:
FIG. 10D is a perspective view of a fourth embodiment of the tamper switch.

FIG. 10A is a perspective view of switch device 140 shown in FIG. 9A, depicting switch device 140 in a normal position (i.e., not compressed). FIG. 10B is a perspective view of switch device 140A shown in FIG. 9B, depicting switch device 140A in a normal position (i.e., not compressed). FIG. 10C is a perspective view of switch device 140C, and FIG. 10D is a perspective view of switch device 140D, depicting additional exemplary embodiments of tamper switch 116. Collectively, FIGS. 9A-9B and 10A-10D show non-limiting examples of tamper switch 116 depicted in FIG. 2. It is to be appreciated that a vast variety of electrical switches are commercially available, thereby representing a vast number of options that are available to implement tamper switch 116 in a particular embodiment. Various terms can be used to describe tamper switch 116, with non-limiting examples being "micro-switch", "limit switch", and "interlock switch". Moreover, micro-switches can be available under various trademarks (e.g., CHERRY™ Switch manufactured by Cherry GmbH (formerly Cherry Corporation).

Figure 11:
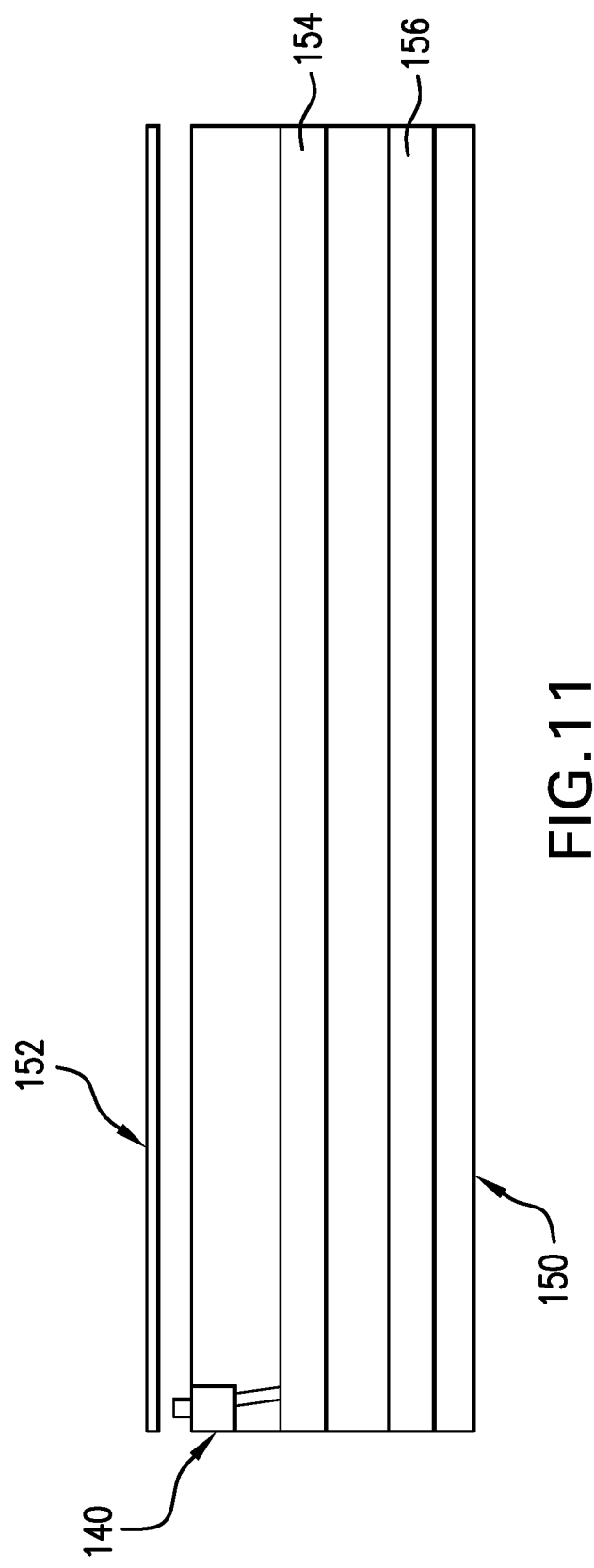
FIG. 11 is side view of an embodiment of the tamper switch in the self-powering tamper detection and response system.

FIG. 11 is side view of an embodiment of tamper switch 116 in an exemplary embodiment. Shown in FIG. 11 are switch device 140, chassis 150, chassis cover 152, and printed circuit boards 154, 156. Switch device 140 is a representative electrical switch, as described above with respect to FIGS. 9A and 10A. Chassis 150 encloses program memory 120 in which program data are stored. During normal operation, chassis cover 152 is in place as shown. Program data are stored on program memory 120 (not shown in FIG. 7), which can be located on printed circuit boards 154, 156. Chassis cover 152 is closed during routine system operation, as depicted in FIG. 11. Switch device 140 is mounted on printed circuit board 154 and is configured to be actuated (i.e., depressed) by chassis cover 152 when chassis cover 152 is closed. Accordingly, in the illustrated embodiment, the mechanical spring of switch device 140 is compressed during routine system operation, thereby holding switch device 140 in the anti-normal position as described above in respect to FIG. 9A. Accordingly, the anti-normal position of switch device 140 exists during routine system operation (i.e., tampering is not occurring). For tampering to occur, chassis cover 152 must be opened for an unauthorized person to gain access to program memory. The opening of chassis cover 152 allows switch device 140 to switch electrical position, move from the "anti-normal" position to the "normal" position. As will be seen in FIG. 12, the switching of switch device 140 can be indicative of a tamper event.

Figure 12:
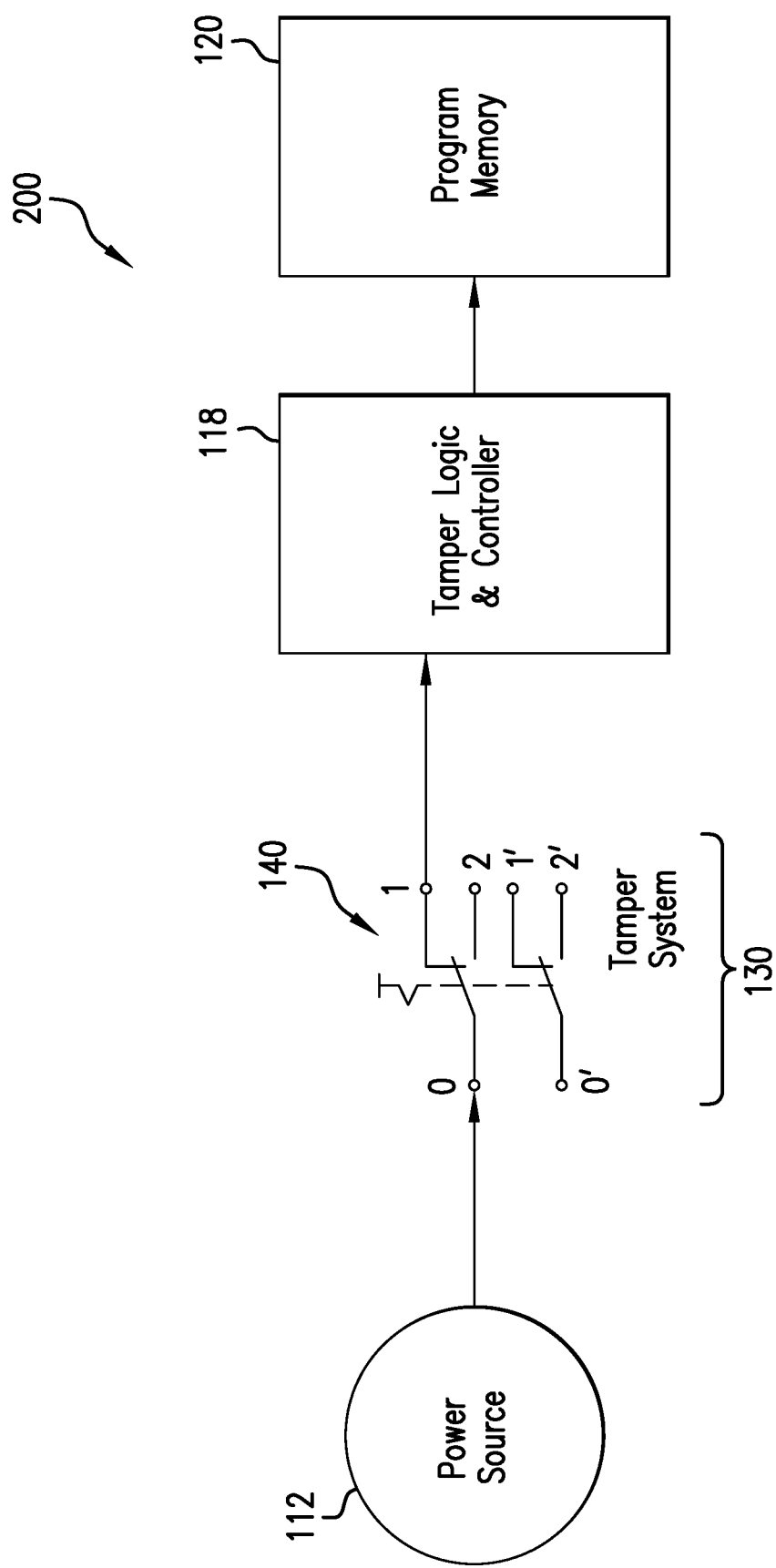
FIG. 12 is an electrical block diagram showing the tamper switch in the self-powering tamper detection and response system.

FIG. 12 is an electrical block diagram showing switch device 140 of FIG. 9A in an exemplary embodiment. Shown in FIG. 12 are tamper system architecture 200, power source 112, tamper controller 118, program memory 120, and switch device 140. In the illustrated embodiment, power source 112, tamper controller 118, and program memory 120 are as described above with respect to FIG. 2, and switch device 140 is described as above with respect to FIG. 9A. Switch 140 functions as a tamper system, for example, as tamper system 130 shown in FIG. 2. When a tamper event occurs, switch device 140 is actuated, connecting electrical power from power source 112 to tamper controller 118, whereby tamper controller 118 provides instructions to program memory 120 that disrupt and/or erase the stored program data from program memory 120, thereby preventing the unauthorized access to stored program data.

In the embodiments described above, for example, with respect to FIGS. 2, 7, and 11-12, it can be important to determine when a tamper condition exists so that sensitive stored program data can be destroyed (i.e., removed, erased, wiped, disrupted). Non-limiting examples of sensitive program data can include software control code, software algorithms, hardware algorithms, reconnaissance information, intelligence data, and cryptographic keys. The destruction of program data is deemed to be necessary when it has been determined that tampering is occurring, meaning there is a possibility that an unauthorized person is attempting to access sensitive program data. The present disclosure is directed at a transducerless means of determining when a chassis cover is being removed as an identifiable indication of tampering. However, there can be situations when an authorized person may need to remove a chassis cover where it can be desirable for program data to not be destroyed. For example, a particular component that is protected by tamper system architecture 200 can require periodic inspection and/or maintenance by an authorized technician in an authorized test facility. In this exemplary situation, a tamper response deactivation technique is needed.

Figure 13:
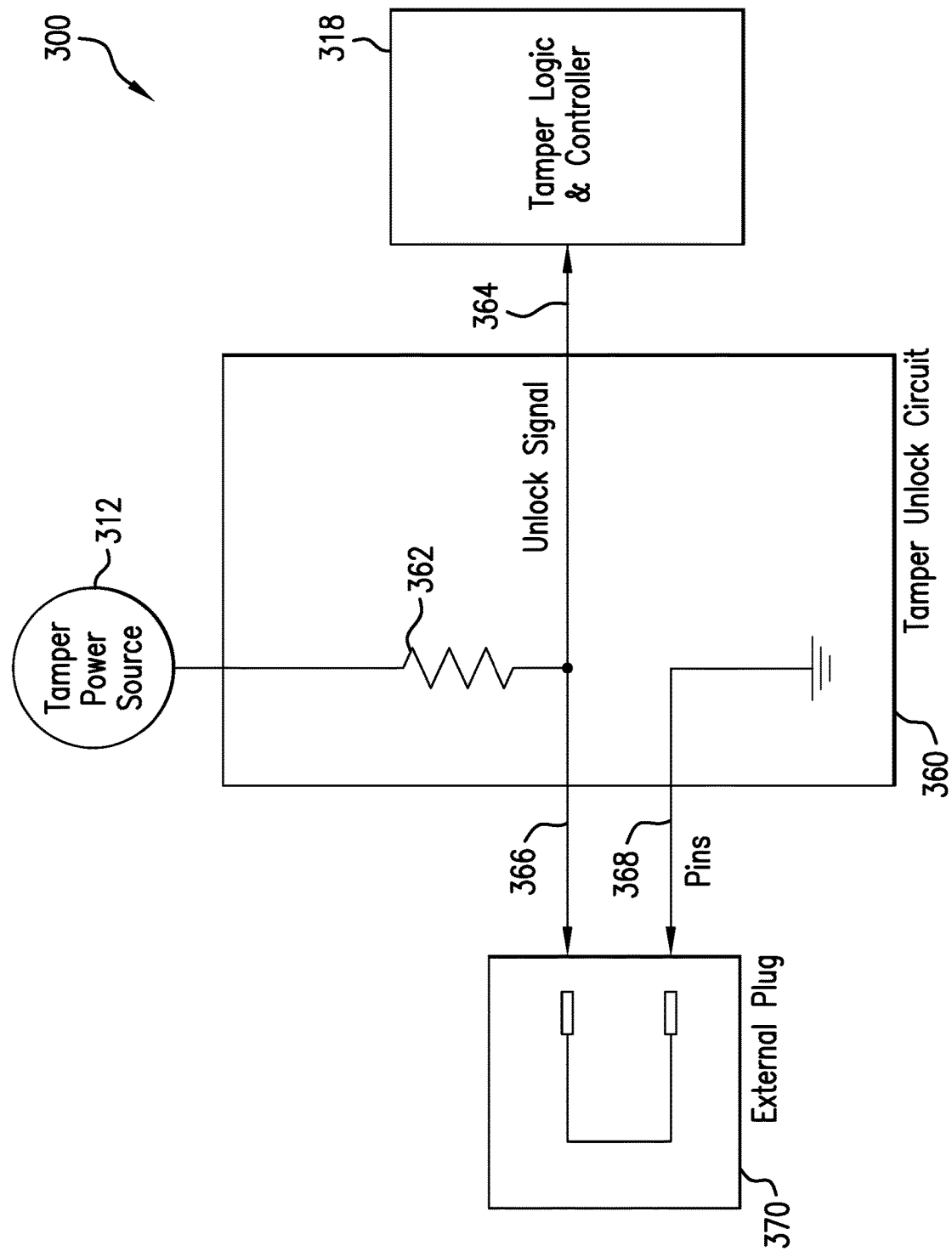
FIG. 13 is an electrical schematic diagram of an embodiment of the tamper deactivation circuit.

FIG. 13 is an electrical schematic diagram of an embodiment of a tamper deactivation circuit. Shown in FIG. 13 are tamper deactivation circuit 300, tamper power source 312, tamper controller 318, tamper unlock circuit 360, bias resistor 362, unlock signal line 364, first pin 366, second pin 368, and external plug 370. Tamper deactivation circuit 300 can be included with tamper system architecture 100 as shown in FIG. 2. When activated by an authorized user, tamper unlock circuit 360 provides unlock signal 364 to tamper controller 318. In the illustrated embodiment, unlock signal 364 is provided continuously to tamper controller 318 during the duration of the maintenance period. Tamper controller 318 is configured to ignore a tamper signal from a tamper system (e.g., tamper system 130 as shown in FIG. 2) while unlock signal 364 is present at tamper controller 318. During the normal operation of the tamper system architecture (not shown), meaning that tamper system architecture is providing protection against a tampering event, tamper deactivation circuit 300 does not deactivate the tamper response. Accordingly, in this normal condition, tamper unlock circuit 360 is not engaged, and the voltage of tamper power source 312 is present at unlock signal 364 as a result of bias resistor 362. Tamper controller 318 is configured so that when a sufficient voltage potential exists at unlock signal 364, tamper controller 318 will function normally (i.e., respond to a tamper event by destroying program data stored in program memory 120). However, during authorized maintenance, a technician can install external plug 370 on tamper unlock circuit 360, electrically connecting first pin 366 to second pin 368 and thereby shunting unlock signal line to ground. Tamper controller 318 is configured to ignore a tamper signal when a ground potential exists at unlock signal 364, thereby deactivating the tamper system architecture. After installing external plug 370, the technician can proceed with opening chassis cover 152 to perform the authorized inspection and/or maintenance.

In an embodiment, external plug 370 can be configured to help prevent a technician from failing to remove external plug 370 form tamper unlock circuit 360 after the completion of the inspection and/or maintenance. For example, in a particular embodiment, external plug 370 can be configured with an encumbering device that is conspicuous and/or prevents normal system operation. In another embodiment, first pin 366 and second pin 368 can be configured to be masked and/or concealed to prevent their identification by an unauthorized user. For example, in a particular embodiment, first pin 366 and/or second pin 368 and/or external plug 370 can be mechanically keyed so that only a particular design of external plug 370 can be used. In another embodiment, first pin 366 and/or second pin 368 can be secluded among other similar-looking pins, whereby only an authorized user is aware of the identity of secluded first pin 366 and/or second pin 368.

Figure 14:
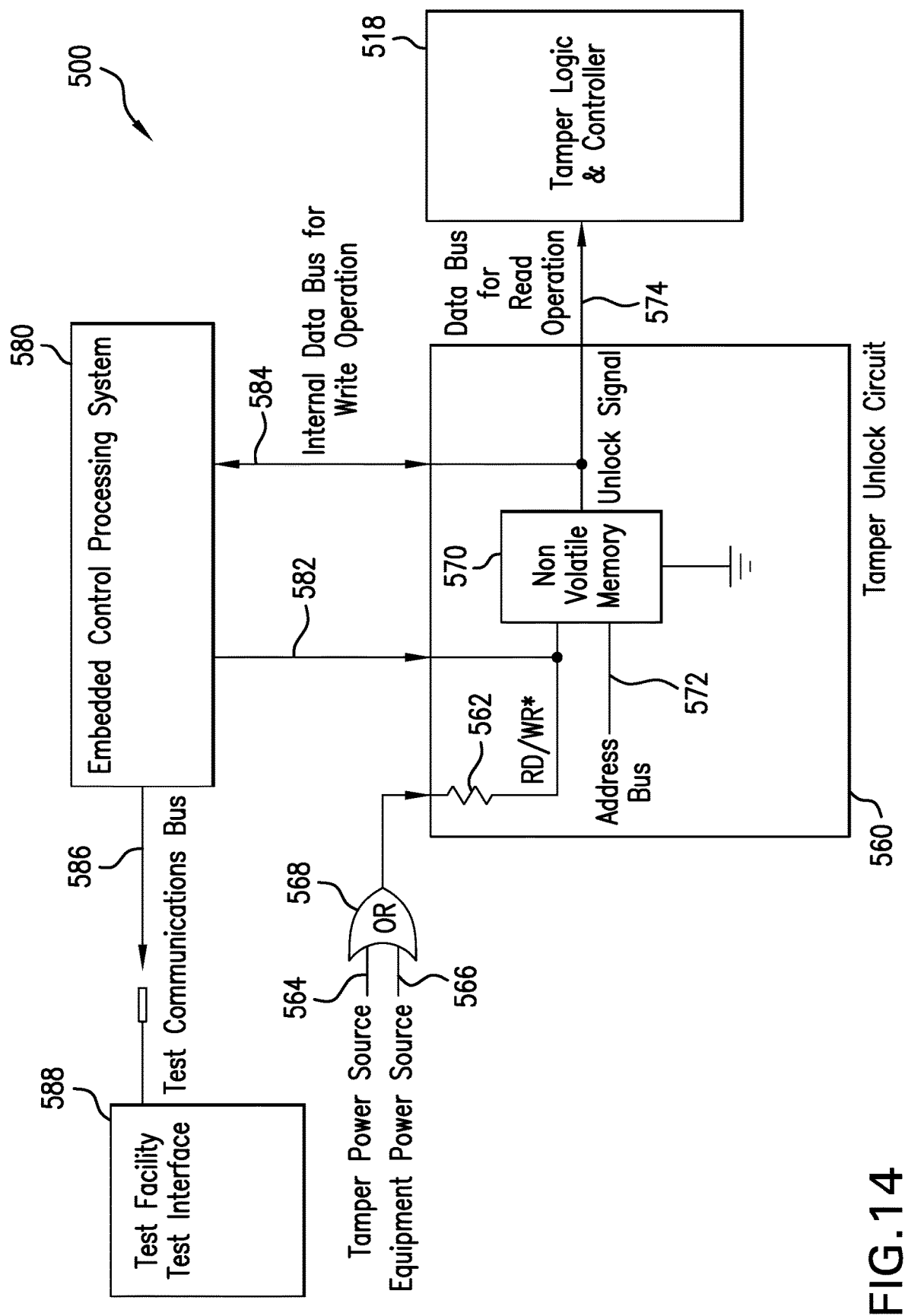
FIG. 14 is an electrical block diagram of a second embodiment of the tamper deactivation circuit.

FIG. 13 is an electrical block diagram of a second embodiment of the tamper deactivation circuit in which the tamper deactivation is accessed through an embedded control. Shown in FIG. 14 are tamper deactivation circuit 500, tamper controller 518, tamper unlock circuit 560, power input resistor 562, tamper power source 564, equipment power source 566, power OR circuit 568, non-volatile memory 570, address bus 572, data bus 574, processing system 580, RD/WR input 582, internal data bus 584, communications bus 586, and test interface 588. In the illustrated embodiment, tamper controller 518 can be substantially similar to tamper controller 118 and tamper power source 564 can be substantially similar to power source 112 as described above in respect to FIG. 2. Accordingly, tamper power source 564 is a long-life source of electrical power. In the illustrated embodiment, equipment power source 566 can be a power supply that energizes the equipment (not shown) being protected by tamper system architecture 100.

Prior to accessing protected equipment by opening the chassis cover (not shown in FIG. 13), an authorized user will access non-volatile memory 570 of tamper unlock circuit 560 by issuing a write command on read/write (RD/WR) input 582 to non-volatile memory 570 via a memory mapped location in processing system 580 to deactivate an indication of a tamper event. An authorized user can access processing system 580 by providing the proper memory mapped location at communications bus 586 from test interface 588. Communications bus 586 can be called a test communications bus, and test interface 588 can be called a test facility test interface, because access by an authorized user can typically occur at an authorized test facility. Processing system 580 can also be called an embedded control processing system because it is embedded within the system architecture. The identity of the memory mapped location within processing system is necessary to provide the tamper deactivation, but the location remains concealed even if the chassis cover is opened to provide access to processing system 580. Therefore, tamper unlock circuit 560 cannot be activated or the memory mapped location determined after the chassis cover has been opened.

Tamper power source 564 and equipment power source 566 provide electrical power to tamper unlock circuit 560 via power OR circuit 568, thereby providing electrical power to tamper power circuit 560 so long as tamper power source 564 or equipment power source 566 (or both) are energized. In the illustrated embodiment, a lock/unlock signal on data bus 574 is only activated when a tamper event is detected. In these embodiments, electrical power is drawn only when a tamper event occurs, thereby energizing tamper power source 564 to supply power to tamper unlock circuit 560, in turn providing an unlock signal to tamper controller 518. Accordingly, power is drawn only when a tamper event occurs, thereby helping to prolong the duration of tamper power source 564. Non-volatile memory 570 is separate from processor system 580 to reduce the power drawn from tamper power source 564 when equipment power source 566 is de-energized. Accordingly, non-volatile memory 570 maintains the desired lock/unlock signal on data bus 574 after processing system 580 is de-energized. Non-volatile memory 570 is configured to always output the proper lock/unlock signal at data bus 574. The condition of non-volatile memory 570 can only be changed when properly over-written by processing system 580 upon the receipt of an authorized signal from test interface 588 at communications bus 586.

In other embodiments, tamper power circuit 560 can remain powered after equipment power source 566 is de-energized by receiving electrical power from tamper power source 564 via power OR circuit 568.

Discussion of Possible Embodiments

The following are non-exclusive descriptions of possible embodiments of the present invention.

A self-powering tamper detection system architecture, comprising: a power source; a tamper detector, configured to identify a tamper event; a tamper switch, electrically connected to the power source and mechanically connected to the tamper detector; a tamper controller, configured to produce a tamper response when the tamper event is identified; and program memory, configured to store program data; wherein: the tamper detector is configured to mechanically actuate the tamper switch when a tamper event occurs; and the tamper response comprises a disruption of the program data.

The self-powering tamper detection system architecture of the preceding paragraph can optionally include, additionally and/or alternatively, any one or more of the following features, configurations and/or additional components:

A further embodiment of the foregoing self-powering tamper detection system architecture, wherein the power source stores electrical energy for at least 5 years.

A further embodiment of the foregoing self-powering tamper detection system architecture, wherein the power source stores electrical energy for at least 20 years.

A further embodiment of the foregoing self-powering tamper detection system architecture, wherein the power source comprises a chemical battery, electrical capacitor, and/or super-capacitor.

A further embodiment of the foregoing self-powering tamper detection system architecture, wherein the program memory comprises a field-programmable gate array (FPGA), flash memory, random access memory (RAM), programmable read-only memory (PROM), and/or erasable programmable read-only memory (EPROM).

A further embodiment of the foregoing self-powering tamper detection system architecture, wherein the program data comprises software control code, software algorithms, hardware algorithms, reconnaissance information, intelligence data, and/or cryptographic keys.

A further embodiment of the foregoing self-powering tamper detection system architecture, wherein the tamper detector and the tamper switch together comprise: a printed circuit board, having an aperture therein; and an embedded transformer, including: a chassis strut, disposed perpendicularly to the printed circuit board; a circular primary winding, encircling the aperture; one or more circular secondary windings, encircling the aperture; and a moveable ferromagnetic core, configured to move axially within the chassis strut, thereby passing through the aperture; wherein: the circular primary winding comprises a trace on the printed circuit board; the one or more circular secondary windings each comprise a trace on the printed circuit board; and the moveable ferromagnetic core is configured such that a tamper event causes the moveable ferromagnetic core to move axially within the chassis strut.

A further embodiment of the foregoing self-powering tamper detection system architecture, wherein the printed circuit board comprises a multi-layer printed circuit board.

A further embodiment of the foregoing self-powering tamper detection system architecture, wherein: the circular primary winding comprises at least 0.75 turns; and the one or more circular secondary windings each comprise at least 0.75 turns.

A further embodiment of the foregoing self-powering tamper detection system architecture, wherein the ferromagnetic magnetic core comprises a chassis screw.

A further embodiment of the foregoing self-powering tamper detection system architecture, the embedded transformer further comprises at least one ferromagnetic ring; and the movable ferromagnetic core is configured to move axially within the at least one ferromagnetic ring.

A further embodiment of the foregoing self-powering tamper detection system architecture, further comprising: an oscillator, configured to produce a time-varying voltage waveform; a driver, configured to apply the time-varying voltage waveform to the circular primary winding, thereby inducing a time-varying voltage waveform in each of the one or more circular secondary windings when the moveable ferromagnetic core magnetically couples the primary winding to each of the one or more circular secondary windings to produce an induced time-varying secondary voltage; a decoder, configured to produce a periodic signal representative of the induced time-varying secondary voltage; and a timer, configured to: produce a first output when the periodic signal is present; and produce a second output when the periodic signal is not present; wherein the second output is indicative of the tamper event.

A further embodiment of the foregoing self-powering tamper detection system architecture, further comprising a computer system.

A method of using a self-powering tamper system architecture comprising a power source, a tamper detector configured to identify a tamper event, a tamper switch electrically connected to the power source and mechanically connected to the tamper detector, a tamper controller configured to produce a tamper response when the tamper event is identified, and program memory configured to store program data, the method comprising the steps of: monitoring, with the tamper detector, for a mechanical movement indicative of a tamper event; mechanically actuating the tamper switch when an indicia of the tamper event occurs, to cause transmission of an electrical signal from the power source to the tamper controller when the indicia of the tamper event occurs; producing, with the tamper controller, a tamper response when the tamper event occurs; and disrupting, with the tamper controller, the program data when the tamper response is produced.

A self-powering tamper detection system, comprising: a power source; a tamper detector, comprising a moveable ferromagnetic core; a tamper switch, comprising: a printed circuit board, having an aperture therein; an embedded transformer, including: a chassis strut, disposed perpendicularly to the printed circuit board; a circular primary winding, encircling the aperture; one or more circular secondary windings, encircling the aperture; and a moveable ferromagnetic core, configured to move axially within the chassis strut, thereby passing through the aperture; and an oscillator, configured to produce a time-varying voltage waveform; a driver, configured to apply the time-varying voltage waveform to the circular primary winding, thereby inducing a time-varying voltage waveform in each of the one or more circular secondary windings when the moveable ferromagnetic core magnetically couples the primary winding to each of the one or more circular secondary windings to produce an induced time-varying secondary voltage; a decoder, configured to produce a periodic signal representative of the induced time-varying secondary voltage; a timer, configured to: produce a first output when the periodic signal is present; and produce a second output when the periodic signal is not present; a tamper controller, configured to produce a tamper response when the tamper event is identified; and program memory, configured to store program data; wherein: the moveable ferromagnetic core is configured such that a tamper event causes the moveable ferromagnetic core to move axially within the chassis strut; the second output is indicative of the tamper event; and the tamper response comprises a disruption of the program data.

The self-powering tamper detection system of the preceding paragraph can optionally include, additionally and/or alternatively, any one or more of the following features, configurations and/or additional components:

A further embodiment of the foregoing self-powering tamper detection system, wherein the power source comprises a chemical battery, electrical capacitor, or supercapacitor.

A further embodiment of the foregoing self-powering tamper detection system, wherein the program memory comprises a field-programmable gate array (FPGA), flash memory, random access memory (RAM), programmable read-only memory (PROM), and/or erasable programmable read-only memory (EPROM).

A further embodiment of the foregoing self-powering tamper detection system, wherein the program data comprises software control code, software algorithms, hardware algorithms, reconnaissance information, intelligence data, and/or cryptographic keys.

A further embodiment of the foregoing self-powering tamper detection system, further comprising a computer system.

A further embodiment of the foregoing self-powering tamper detection system, further comprising an aeronautical vehicle.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A self-powering tamper detection system architecture, comprising:
    a power source;
    a tamper detector, configured to identify a tamper event;
    a tamper switch, electrically connected to the power source and mechanically connected to the tamper detector;
    a tamper controller, configured to produce a tamper response when the tamper event is identified; and
    program memory, configured to store program data;
    wherein:
        the tamper detector is configured to mechanically actuate the tamper switch when a tamper event occurs; and
        the tamper response comprises a disruption of the program data; and
    wherein the tamper detector and the tamper switch together comprise:
        a printed circuit board, having an aperture therein; and
        an embedded transformer, including:
            a chassis strut, disposed perpendicularly to the printed circuit board;
            a circular primary winding, encircling the aperture;
            one or more circular secondary windings, encircling the aperture; and
            a moveable ferromagnetic core, configured to move axially within the chassis strut, thereby passing through the aperture;
        wherein:
            the circular primary winding comprises a trace on the printed circuit board;
            the one or more circular secondary windings each comprise a trace on the printed circuit board; and
            the moveable ferromagnetic core is configured such that a tamper event causes the moveable ferromagnetic core to move axially within the chassis strut.

2. The self-powering tamper detection system architecture of claim 1, wherein the power source stores electrical energy for at least 5 years.

3. The self-powering tamper detection system architecture of claim 1, wherein the power source stores electrical energy for at least 20 years.

4. The self-powering tamper detection system architecture of claim 1, wherein the power source comprises a chemical battery, electrical capacitor, and/or super-capacitor.

5. The self-powering tamper detection system architecture of claim 1, wherein the program memory comprises a field-programmable gate array (FPGA), flash memory, random access memory (RAM), programmable read-only memory (PROM), and/or erasable programmable read-only memory (EPROM).

6. The self-powering tamper system architecture of claim 1, wherein the program data comprises software control code, software algorithms, hardware algorithms, reconnaissance information, intelligence data, and/or cryptographic keys.

7. The self-powering tamper detection system architecture of claim 1, wherein the printed circuit board comprises a multi-layer printed circuit board.

8. The self-powering tamper detection system architecture of claim 7, wherein:
    the circular primary winding comprises at least 0.75 turns; and
    the one or more circular secondary windings each comprise at least 0.75 turns.

9. The self-powering tamper detection system architecture of claim 1, wherein the ferromagnetic magnetic core comprises a chassis screw.

10. The self-powering tamper detection system architecture of claim 1, wherein:
    the embedded transformer further comprises at least one ferromagnetic ring; and
    the movable ferromagnetic core is configured to move axially within the at least one ferromagnetic ring.

11. The self-powering tamper detection system architecture of claim 1, further comprising:
    an oscillator, configured to produce a time-varying voltage waveform;
    a driver, configured to apply the time-varying voltage waveform to the circular primary winding, thereby inducing a time-varying voltage waveform in each of the one or more circular secondary windings when the moveable ferromagnetic core magnetically couples the primary winding to each of the one or more circular secondary windings to produce an induced time-varying secondary voltage;
    a decoder, configured to produce a periodic signal representative of the induced time-varying secondary voltage; and
    a timer, configured to:
        produce a first output when the periodic signal is present; and
        produce a second output when the periodic signal is not present;
    wherein the second output is indicative of the tamper event.

12. A computer system, comprising the self-powering tamper system architecture of claim 1.

13. A method of using the self-powering tamper system architecture of claim 1 comprising the steps of:
    monitoring, with the tamper detector, for a mechanical movement indicative of a tamper event;
    mechanically actuating the tamper switch when an indicia of the tamper event occurs, to cause transmission of an electrical signal from the power source to the tamper controller when the indicia of the tamper event occurs;
    producing, with the tamper controller, a tamper response when the tamper event occurs; and
    disrupting, with the tamper controller, the program data when the tamper response is produced.

14. A self-powering tamper detection system, comprising:
    a power source;
    a tamper detector, comprising a moveable ferromagnetic core;
    a tamper switch, comprising:
        a printed circuit board, having an aperture therein;
        an embedded transformer, including:
            a chassis strut, disposed perpendicularly to the printed circuit board;
            a circular primary winding, encircling the aperture;

one or more circular secondary windings, encircling the aperture; and a moveable ferromagnetic core, configured to move axially within the chassis strut, thereby passing through the aperture; and an oscillator, configured to produce a time-varying voltage waveform;

a driver, configured to apply the time-varying voltage waveform to the circular primary winding, thereby inducing a time-varying voltage waveform in each of the one or more circular secondary windings when the moveable ferromagnetic core magnetically couples the primary winding to each of the one or more circular secondary windings to produce an induced time-varying secondary voltage;

a decoder, configured to produce a periodic signal representative of the induced time-varying secondary voltage;

a timer, configured to:
produce a first output when the periodic signal is present; and
produce a second output when the periodic signal is not present;

a tamper controller, configured to produce a tamper response when the tamper event is identified; and program memory, configured to store program data;

wherein:
the moveable ferromagnetic core is configured such that a tamper event causes the moveable ferromagnetic core to move axially within the chassis strut;
the second output is indicative of the tamper event; and
the tamper response comprises a disruption of the program data.

15. The self-powering tamper detection system of claim 14, wherein the power source comprises a chemical battery, electrical capacitor, or super-capacitor.

16. The self-powering tamper detection system of claim 14, wherein the program memory comprises a field-programmable gate array (FPGA), flash memory, random access memory (RAM), programmable read-only memory (PROM), and/or erasable programmable read-only memory (EPROM).

17. The self-powering tamper detection system of claim 14, wherein the program data comprises software control code, software algorithms, hardware algorithms, reconnaissance information, intelligence data, and/or cryptographic keys.

18. A computer system, comprising the self-powering tamper system of claim 14.

19. An aeronautical vehicle, comprising the computer system of claim 18.

* * * * *